(12) United States Patent
Chen

(10) Patent No.: US 10,456,670 B2
(45) Date of Patent: *Oct. 29, 2019

(54) HANDHELD GAME CONTROLLER ASSEMBLY

(71) Applicant: DEXIN CORPORATION, New Taipei (TW)

(72) Inventor: Yi-Shun Chen, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 24 days.

This patent is subject to a terminal disclaimer.

(21) Appl. No.: 14/505,689

(22) Filed: Oct. 3, 2014

(65) Prior Publication Data

US 2016/0001176 A1    Jan. 7, 2016

(30) Foreign Application Priority Data

Jul. 4, 2014    (TW) .............................. 103211953 U

(51) Int. Cl.
*A63F 13/24*    (2014.01)
*A63F 13/98*    (2014.01)

(52) U.S. Cl.
CPC .............. *A63F 13/24* (2014.09); *A63F 13/98* (2014.09)

(58) Field of Classification Search
CPC ................................. A63F 13/24; A63F 13/98
See application file for complete search history.

(56) References Cited

U.S. PATENT DOCUMENTS

| | | | | |
|---|---|---|---|---|
| 7,833,097 | B1* | 11/2010 | Maddox | A63F 13/23 455/556.1 |
| 2011/0263328 | A1* | 10/2011 | Yamashita | A63F 13/213 463/36 |
| 2014/0364232 | A1* | 12/2014 | Cramer | A63F 13/92 463/37 |

* cited by examiner

*Primary Examiner* — Jasson H Yoo
(74) *Attorney, Agent, or Firm* — Li & Cai Intellectual Property (USA) Office

(57) ABSTRACT

A handheld game controller assembly adapted to combine with a portable electronic device includes a game controller, a receiving receptacle and an external retaining device. The game controller has a pair of holding portions and a transversal portion arranged between the pair of holding portions. The receiving receptacle is fixedly configured at a front end of the transversal portion. The external retaining device has a plugging unit removably engaged in and fixed to the receiving receptacle, and a clipping unit connected to the plugging unit for clipping a portable electronic device.

13 Claims, 6 Drawing Sheets

HANDHELD GAME CONTROLLER ASSEMBLY

BACKGROUND OF THE INVENTION

1. Field of the Invention

The instant disclosure relates to a handheld game controller assembly adapted to combine with a portable electronic device; in particular, to a handheld game controller assembly with real buttons which can retain and electrically connect to a portable electronic device, so that user can operate the portable electronic device by the handheld game controller assembly.

2. Description of Related Art

A variety of video games is rapidly appearing on smart phones following the development and advancement of hardware efficiency on the smart phones. Smart phone is typically operated by a touch panel, and the operation interface is limited to only simulated buttons for the operation of video game. However, simulated buttons do not provide real tactile feedback at all, and the directional operation is also insensitive, thus the operation experience is greatly affected. The tactile feedback of touch panel still has unrealistic controls. For example, the tactile feedback does not have a real time response with respect to the user's pressure for each press of a simulated button.

In the other aspect, the traditional gamepad with buttons has well tactile feedback, thus many users still prefer the traditional gamepad. To address the above issues, a game controller is an issue intended to resolve, so as to combine a portable electronic device, such as smart phone or tablet PC, with a game controller, to improve operation of mobile phone and tablet PC.

BRIEF SUMMARY OF THE INVENTION

The instant disclosure provides a handheld game controller assembly adapted to combine with a portable electronic device, which provides an external retaining device removably assembled to a game controller for retaining a portable electronic device, so that user can operate the portable electronic device through using the game controller.

According to one exemplary embodiment of the instant disclosure, a handheld game controller assembly is provided, which includes a game controller, a receiving receptacle and an external retaining device. The game controller has a pair of holding portions and a transversal portion arranged between the pair of holding portions. The receiving receptacle is fixed and arranged at a front end of the transversal portion. The external retaining device has a plugging unit removably engaged in and fixed to the receiving receptacle, and a clipping unit connected to the plugging unit for clipping the portable electronic device.

Thus, the present disclosure has advantages as followed. The present disclosure provides the external retaining device which is very easily and quickly assembled to or dismounted from the game controller. The external retaining device can be assembled to the game controller when it is demanded.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[First Embodiment]

Figure 1:
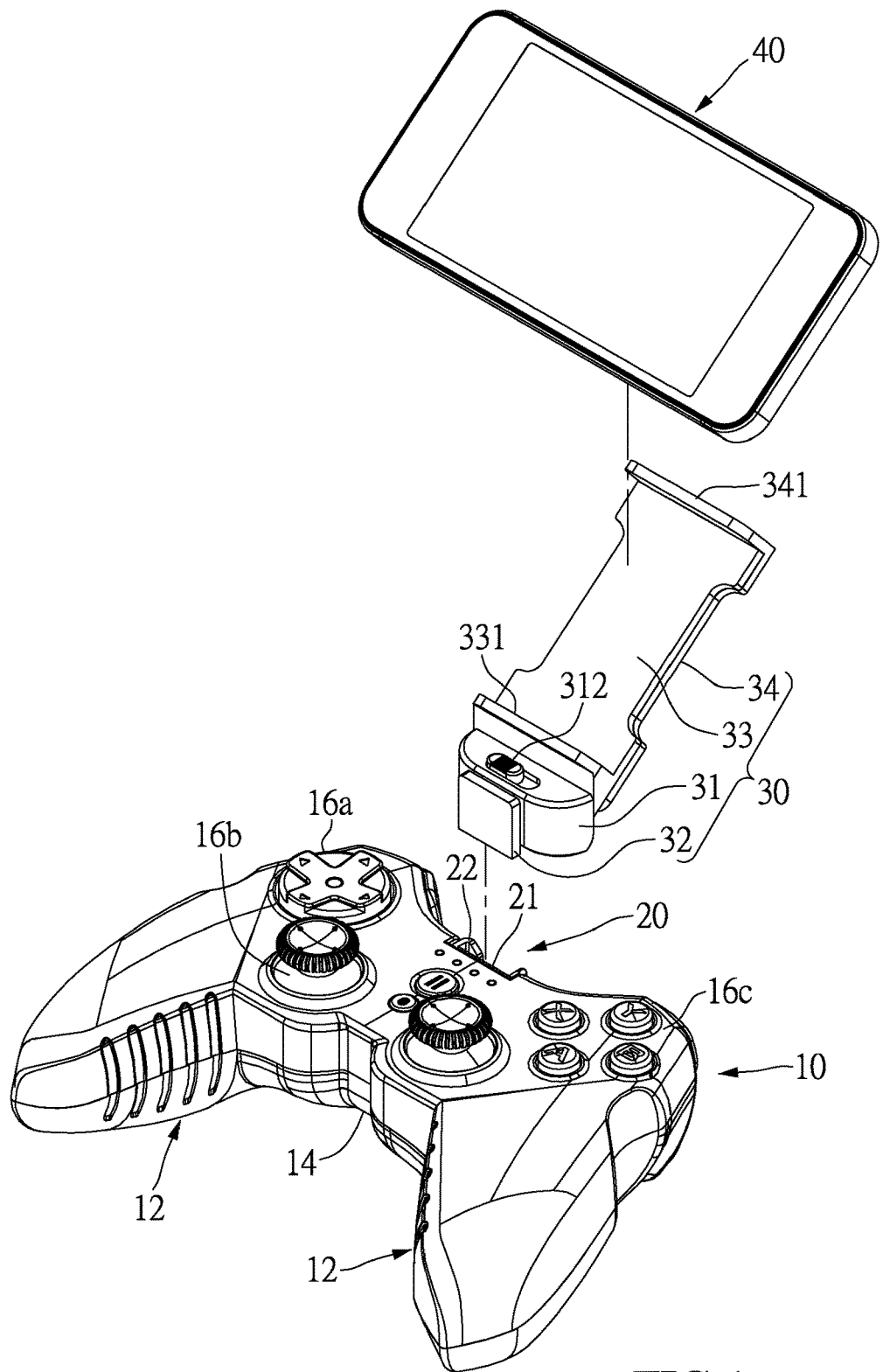
FIG. 1 is a perspective view showing a handheld game controller assembly adapted to combine with a portable electronic device of the instant disclosure.
Figure 2:
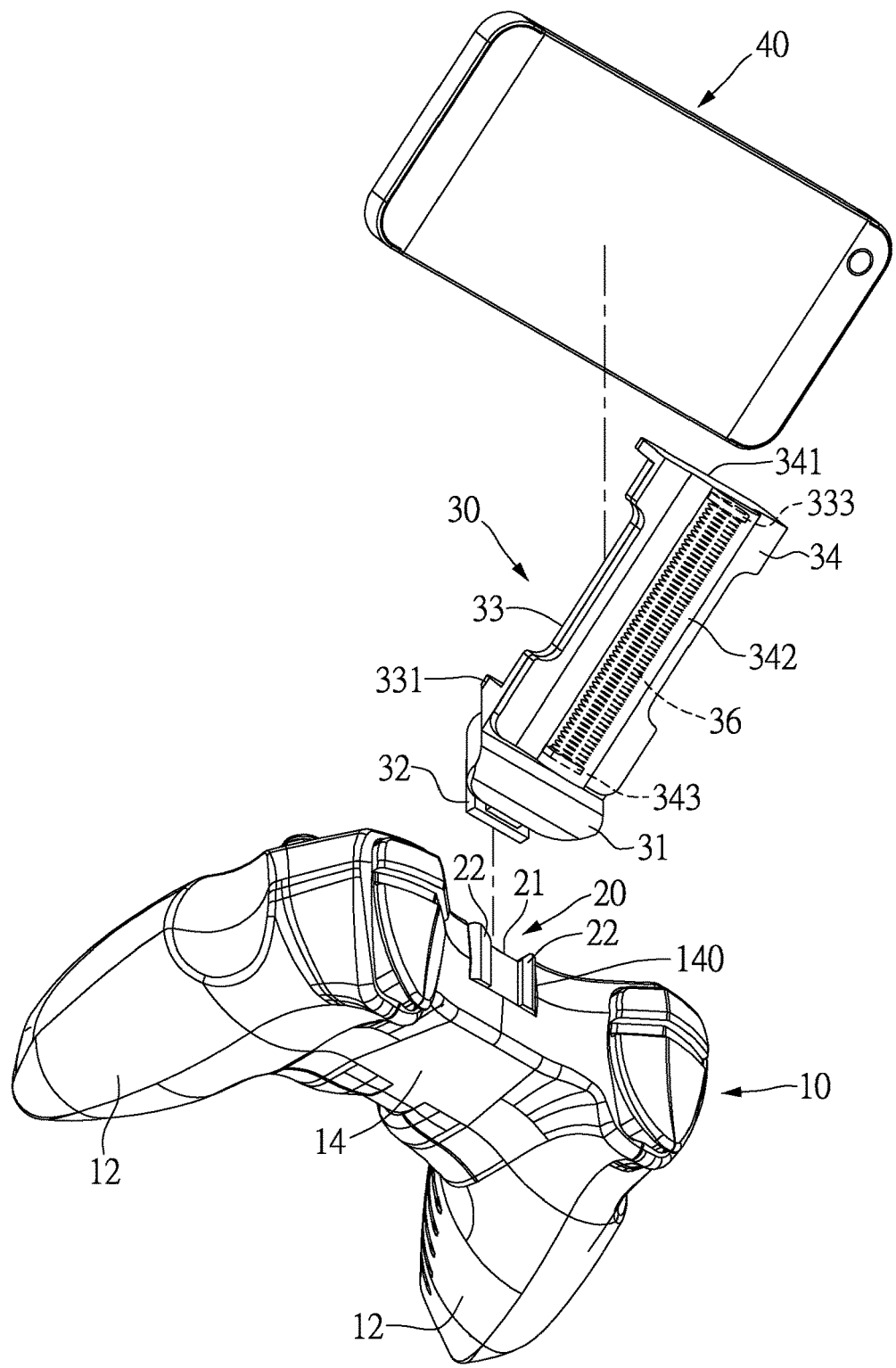
FIG. 2 is another perspective view showing the handheld game controller assembly adapted to combine with portable electronic device of the instant disclosure.

Please refer to FIGS. 1 and 2 showing perspective views of handheld game controller assembly adapted to combine with a portable electronic device according to the instant disclosure. The present disclosure provides a handheld game controller assembly adapted to combine with a portable electronic device, which includes a game controller 10, a receiving receptacle 20, and an external retaining device 30.

The game controller 10 has a pair of holding portions 12, and a transversal portion 14 arranged between the pair of holding portions 12. Besides, the game controller 10 has a plurality of operation switches on a top surface thereof, such as multi-directional buttons 16a, navigation switches 16b and controlling buttons 16c.

As shown in FIG. 2 of this embodiment, the transversal portion 14 of the game controller 10 has a concave portion 140. The concave portion 140 is concavely formed at a front surface of the transversal portion 14, the receiving receptacle 20 is arranged in the concave portion 140. The height of the concave portion 140 is substantially equal to the height of the receiving receptacle 20.

The receiving receptacle 20 is fixed and disposed at a front end of the transversal portion 14, also the receiving receptacle 20 is arranged perpendicular to a top surface of the game controller 10 in this embodiment. The receiving receptacle 20 of this embodiment can be a metallic plate made by bending, but it is not limited thereto. The receiving receptacle 20 has a base plate 21 fixed to the transversal portion 14 and a pair of side boards 22 formed at two sides of the base plate 21. An inserting slot (not labelled) is formed between the base plate 21 and the pair of side boards 22. The side boards 22 are substantially L-shaped and extending forward from two sides of the base plate 21.

The external retaining device 30 has an adaptor portion 31, a plugging unit 32 is removably engaged and fixed in the receiving receptacle 20, and a clipping unit (elements labelled as 33 and 34) connected to the plugging unit 32. The clipping unit is used to clip a portable electronic device 40, such as smart mobile phones and tablets. The plugging unit 32 has a contour corresponding to the inserting slot of the receiving receptacle 20.

Figure 5:
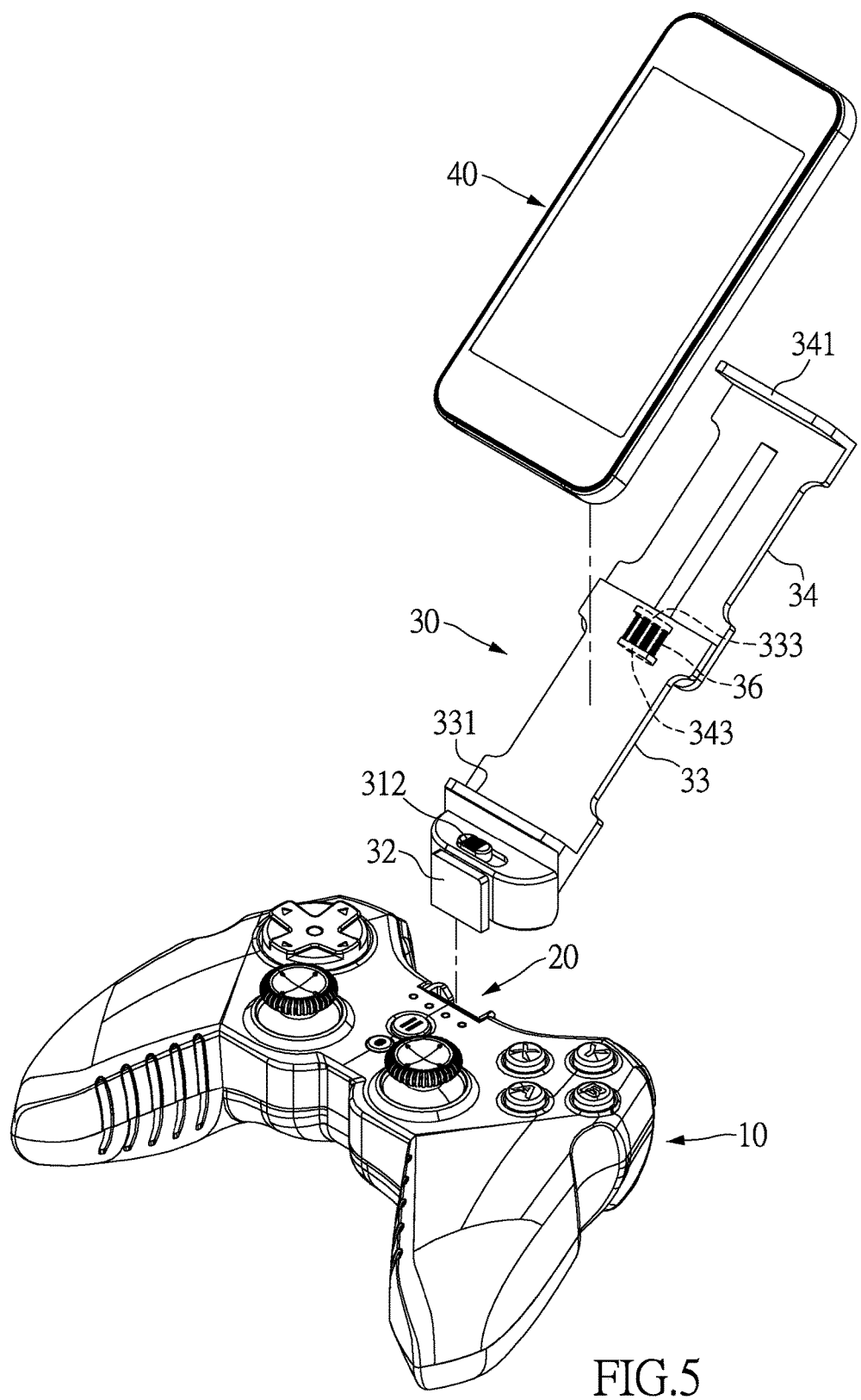
FIG. 5 is an illustrative view showing an external retaining device in an extension condition of the handheld game controller assembly of the instant disclosure.

Please refer to FIG. 1 and FIG. 2. In this embodiment, the clipping unit has a first arm 33 and a second arm 34 slidably engaged to the first arm 33. The first arm 33 is integrally formed with the adaptor portion 31, and has a lower stopper 331. The second arm 34 has an upper holder 341. The second arm 34 is disposed at a bottom surface of the first arm 33. The second arm 34 can be slide upwardly to provide a larger clipping range (as shown in FIG. 5). An angle is formed between the lower stopper 331 of the first arm 33 and the plugging unit 32, so that the portable electronic device 40 can be properly disposed thereon in an inclined manner.

As shown in FIG. 2, the clipping unit further includes an elastic element 36 connected the first arm 33 with the second arm 34. In this embodiment, the elastic element 36 is a tensioned spring, but it is not limited thereto. The elastic element 36 has one end fixed to the first arm 33, and the other end fixed to the second arm 34. When the second arm 34 is pulled upwardly away from the first arm 33, the elastic element 36 provides the second arm 34 an elastic force toward the first arm 33. In this embodiment, the second arm 34 has a protruded gripping portion 342. The gripping portion 342 substantially resembled a semi-cylinder, which can be held by user to slide the second arm 34 upwardly. The elastic element 36 is disposed in the gripping portion 342.

Concerning the way to fix the elastic element 36, an example is illustrated as followed. The first arm 33 has a first fixing part 333 extended into the gripping portion 342 of the second arm 34 to connect the top end of the elastic element 36. The second arm 34 has a second fixing part 343 to connect the bottom end of the elastic element 36. When the second arm 34 is pulled upwardly, the second fixing part 343 is moved simultaneously to compress the elastic element 36. When the user releases the second arm 34, the elastic element 36 recovers and returns to the original position and a force toward the first arm 33 is provided to the second arm 34. Thus, the portable electronic device 40 can be clipped between the first arm 33 and the second arm 34. A guiding rod can be put in the elastic element 36 if necessary.

Figure 3:
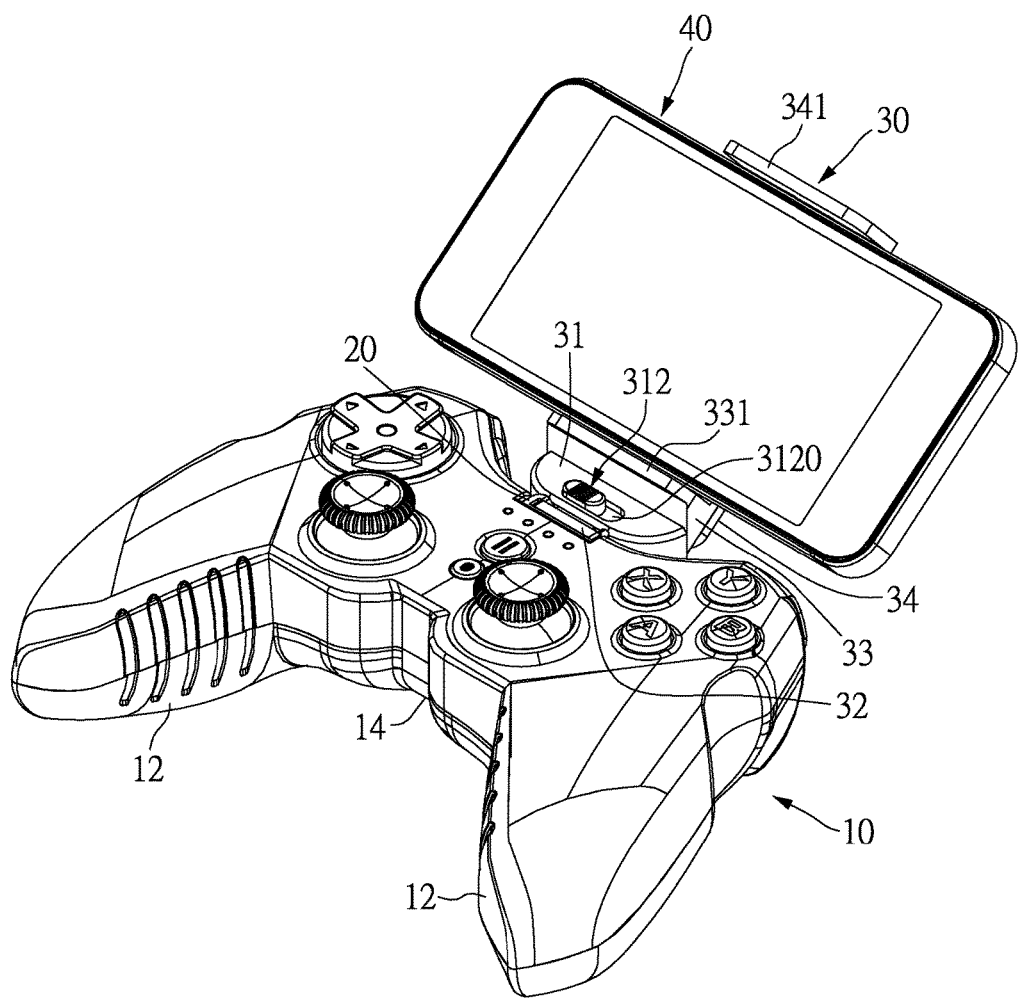
FIG. 3 is a perspective view showing the handheld game controller assembly retaining a portable electronic device according to the instant disclosure.
Figure 4:
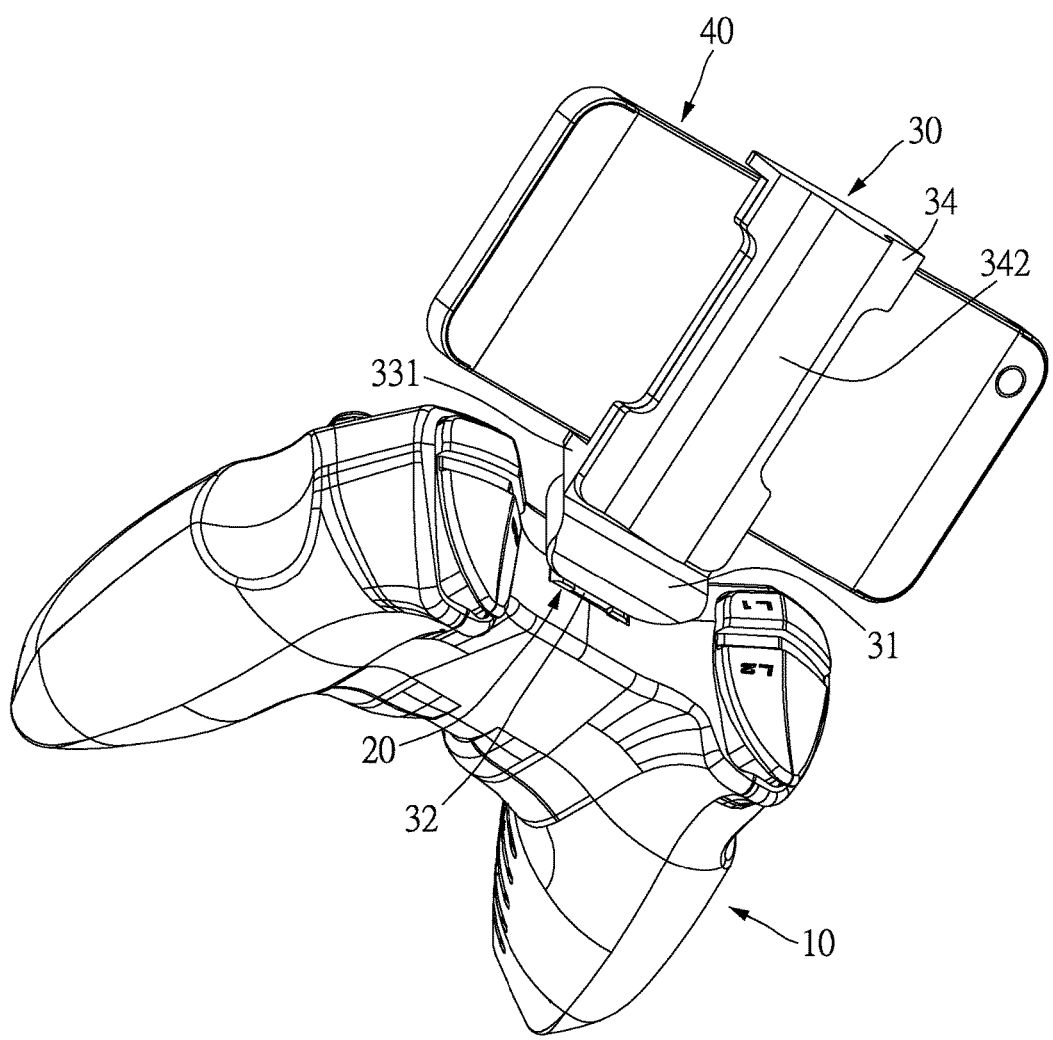
FIG. 4 is another perspective view showing the handheld game controller assembly retaining a portable electronic device according to the instant disclosure.

Please refer to FIGS. 3 and 4, which are perspective views of the handheld game controller assembly of the present disclosure clipped to the portable electronic device 40. When the present disclosure is assembled, the plugging unit 32 of the external retaining device 30 is inserted into the top portion to the bottom portion of the receiving receptacle 20. The external retaining device 30 can be fixed to the receiving receptacle 20 by frictional force or a locking mechanism. The first arm 33 and the second arm 34 mutually coupled, and the portable electronic device 40 is clipped by the upper holder 341 and the lower stopper 331. Concerning the electrical connecting manner between the portable electronic device 40 and the game controller 10, they can be connected wirelessly via Bluetooth, NFC, and etc, or connected via a cable such as OTG (On-the-Go).

As shown in FIG. 3, the external retaining device 30 further includes a locking unit 312 arranged on the adaptor portion 31. The locking unit 312 fixes the plugging unit 32 to the receiving receptacle 20. The locking unit 312 has a sliding button 3120. The sliding button 3120 is exposed from the adaptor portion 31 and arranged adjacent to the plugging unit 32. For a preferable embodiment, it is automatically locked and fixed when the plugging unit 32 of the external retaining device 30 is inserted into the receiving receptacle 20. The fixing manner can be engagement, or tight matched, or inserting. The sliding button 3120 can be pushed to unlocked, so that the external retaining device 30 can be removed from the receiving receptacle 20.

Please refer to FIG. 5, which is a perspective view of the second arm 34 sliding upward according to this embodiment. The present disclosure can provide a bigger clipping range for retaining the portable electronic device 40 in an erected manner. The second arm 34 is upwardly slid out from the bottom surface of the first arm 33. The upper holder 341 is arranged above and distal from the lower stopper 331 of the first arm 33. The distance between the upper holder 341 and the lower stopper 331 can be enlarged to retain a bigger one of the portable electronic device or the portable electronic device 40 in an erective manner. When the second arm 34 is pulled out, the elastic element 36 in the second arm 34 is simultaneously compressed so as to provide the second arm 34 an elastic force moving toward the first arm 33.

[Second Embodiment]

Figure 6:
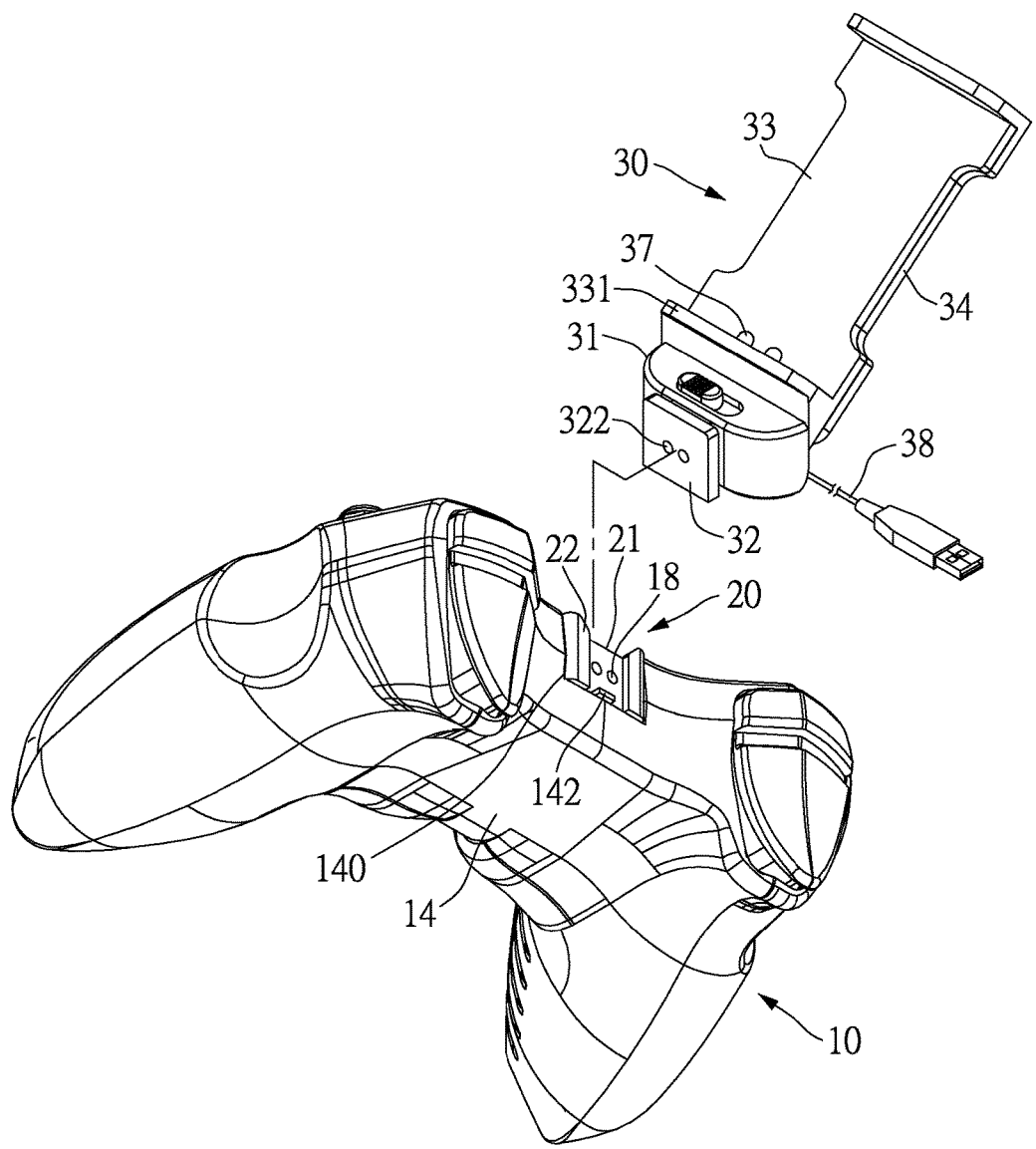
FIG. 6 is a perspective view showing a handheld game controller assembly of second embodiment according to the instant disclosure.

Please refer to FIG. 6 showing a handheld game controller assembly adapted to combine with a portable electronic device of second embodiment according to the present disclosure. The difference between this embodiment and the above embodiment is that the game controller 10 further has a detecting switch 142 arranged adjacent to the concave portion 140. When the plugging unit 32 of the external retaining device 30 is inserted into the receiving receptacle 20, the detecting switch 142 is activated, so as to automatically turn on or activate the electronic element connected to the portable electronic device 40 via Bluetooth or NFC (Near Field Communication).

Besides, the receiving receptacle 20 has a plurality of first conductive terminals 18 which are electrically connected to the game controller 10 and the first conductive terminals are exposed from the inserting slot (not labeled). The external retaining device 30 has a plurality of second conductive terminals 322 fixed in the plugging unit 32. When the external retaining device 30 is fixed in the game controller 10, the second conductive terminals 322 are electrically connected to the first conductive terminals 18 and could be arranged to electrically connect to the portable electronic device 40 of the clipping unit. One practical way is set a connector 37 on the lower stopper 331 of the first arm 33. The connector 37 of this embodiment is exposed on the top surface of the lower stopper 331, and it can be elastic terminals or in other manner, to electrically connect to the portable electronic device 40, such as contacts on a periphery cradle arranged at one side of a smart phone or a tablet.

This embodiment also could provide a cable 38 to electrically connect the second conductive terminals 322 of the external retaining device 30 to the game controller 10. The cable 38 can be extended from the bottom of the adaptor portion 31 outwardly, which can transfer signals or electrical power between the game controller 10 and the portable electronic device 40.

In summary, the present disclosure has the advantages as follows. The external retaining device 30 of the embodiment is removably assembled to the game controller 10, so as to clip the portable electronic device 40 when it is required. Thus, user can operate the portable electronic device 40 through the game controller 10. To assembly between the external retaining device 30 and the game controller 10 is easy and quick. If it is required, the external retaining device 30 is assembled to the game controller 10. The assembly manner between the receiving receptacle 20 and the plugging unit 32 can hold a preferred load. Besides, the clipping unit range between the first arm 33 and the second arm 34 can be adjustable, so that it can clip various sizes of the portable electronic device 40. Moreover, the external retaining device 30 can be electrically connected to the game controller 10.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A handheld game controller assembly adapted to combine with a portable electronic device, comprising:
   a game controller, having a pair of holding portions, and a transversal portion arranged between the pair of holding portions, wherein the transversal portion is formed with a concave portion thereon;
   a receiving receptacle, fixed and arranged in the concave portion of the transversal portion, wherein the receiving receptacle includes a base plate and a pair of side boards, the base plate is fixed on the transversal portion, the pair of side boards are respectively arranged at two sides of the base plate, and an inserting slot is formed between the base plate and the pair of side boards;
   an external retaining device, having a plugging unit removably engaged and fixed in the receiving receptacle, and a clipping unit connected to the plugging unit to clip a portable electronic device thereon, wherein the plugging unit has a shape corresponding to the shape of the inserting slot; and
   a detecting switch being arranged adjacent to the concave portion, wherein the detecting switch is activated when the plugging unit of the external retaining device is inserted in the receiving receptacle.

2. The handheld game controller assembly according to claim 1, wherein the external retaining device further includes a locking unit to fix the plugging unit to the receiving receptacle.

3. The handheld game controller assembly according to claim 2, wherein the locking unit has a sliding button arranged proximate to the plugging unit.

4. The handheld game controller assembly according to claim 1, wherein the clipping unit has a first arm, and a second arm movably engaged to the first arm.

5. The handheld game controller assembly according to claim 4, wherein the clipping unit has an elastic element connecting the first arm to the second arm.

6. The handheld game controller assembly according to claim 5, wherein the second arm is arranged on a bottom surface of the first arm, the second arm has a gripping portion protruded therefrom, wherein the elastic element is arranged in the gripping portion.

7. The handheld game controller assembly according to claim 4, wherein the receiving receptacle has a plurality of first conductive terminals, the first conductive terminals are electricity connected to the game controller and are exposed from the inserting slot, wherein the external retaining device includes a plurality of second conductive terminals fixed on the plugging unit, when the external retaining device is fixed to the game controller, the second conductive terminals are electrically connected to the first conductive terminals, the second conductive terminals are selectively and electrically connected to the portable electronic device retained on the clipping unit.

8. The handheld game controller assembly according to claim 7, wherein the external retaining device further has a connector arranged on the first arm, the connector is electrically connected to the second conductive terminals, the connector is selectively and electrically connected to the portable electronic device; wherein the first arm has a lower stopper, the connector is exposed from a top surface of the lower stopper.

9. The handheld game controller assembly according to claim 7, wherein the external retaining device further includes a cable electrically connected to the second conductive terminals, wherein the cable is selectively and electrically connected to the portable electronic device.

10. A handheld game controller assembly adapted to combine with a portable electronic device, comprising:
    a game controller, having a pair of holding portions, and a transversal portion arranged between the pair of holding portions;
    a receiving receptacle, fixed and arranged at a front end of the transversal portion;
    an external retaining device, having a plugging unit removably engaged and fixed in the receiving receptacle, and a clipping unit connected to the plugging unit to clip a portable electronic device thereon, wherein the receiving receptacle includes a base plate and a pair of side boards, the base plate is fixed on the transversal portion, the pair of side boards are respectively arranged at two sides of the base plate, and an inserting slot is formed between the base plate and the pair of side boards;
    wherein the receiving receptacle has a plurality of first conductive terminals, the first conductive terminals are electricity connected to the game controller and are exposed from the inserting slot, wherein the external retaining device includes a plurality of second conductive terminals fixed on the plugging unit; when the external retaining device is fixed to the game controller, the second conductive terminals are electrically connected to the first conductive terminals, and the second conductive terminals are selectively and electrically connected to the portable electronic device which is retained on the clipping unit.

11. The handheld game controller assembly according to claim 10, wherein the clipping unit has a first arm, and a second arm movably engaged to the first arm.

12. The handheld game controller assembly according to claim 11, wherein the external retaining device further has a connector arranged on the first arm, the connector is electrically connected to the second conductive terminals, the connector is selectively and electrically connected to the portable electronic device; wherein the first arm has a lower stopper, the connector is exposed from a top surface of the lower stopper.

13. The handheld game controller assembly according to claim 11, wherein the external retaining device further includes a cable electrically connected to the second conductive terminals, wherein the cable is selectively and electrically connected to the portable electronic device.

* * * * *